US008346611B2

(12) United States Patent
Reid et al.

(10) Patent No.: US 8,346,611 B2
(45) Date of Patent: Jan. 1, 2013

(54) SYSTEMS AND METHODS FOR PRE-PAID FUTURES PROCUREMENT

(75) Inventors: William Reid, Omaha, NE (US); John Ostrowski, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 489 days.

(21) Appl. No.: 12/427,599

(22) Filed: Apr. 21, 2009

(65) Prior Publication Data

US 2010/0268611 A1 Oct. 21, 2010

(51) Int. Cl.
*G06Q 30/00* (2012.01)
(52) U.S. Cl. .............. 705/16; 705/14.13; 705/14.14; 705/14.23; 705/14.35; 705/26.1
(58) Field of Classification Search .......... 705/26.1, 705/14.13, 14.23, 14.34, 35, 37, 39, 40
See application file for complete search history.

(56) References Cited

U.S. PATENT DOCUMENTS

| | | | |
|---|---|---|---|
| 3,599,151 A | 8/1971 | Harr | |
| 3,833,395 A | 9/1974 | Gosnell | |
| 4,321,672 A | 3/1982 | Braun et al. | |
| 4,562,340 A | 12/1985 | Tateisi et al. | |
| 4,562,341 A | 12/1985 | Ohmae et al. | |
| 4,630,200 A | 12/1986 | Ohmae et al. | |
| 4,678,895 A | 7/1987 | Tateisi et al. | |
| 4,722,554 A | 2/1988 | Pettit | |
| 4,812,628 A | 3/1989 | Boston et al. | |
| 4,902,881 A | 2/1990 | Janku | |
| 4,961,142 A | 10/1990 | Elliott et al. | |
| 5,053,607 A | 10/1991 | Carlson et al. | |
| 5,119,293 A | 6/1992 | Hammond | |
| 5,175,682 A | 12/1992 | Higashiyama et al. | |

(Continued)

FOREIGN PATENT DOCUMENTS

EP 0481135 A1 4/1992

(Continued)

OTHER PUBLICATIONS

Business Wire, "E-Commerce, Email and E-greeting Cards Combine in New Web Site Designed by Interactive Bureau", Sep. 14, 1999 (abstract), [online] [retrieved on May 1, 2002], retrieved from PRPQUEST Database, 2 pages.

(Continued)

*Primary Examiner* — Matthew Gart
*Assistant Examiner* — Olusegun Goyea
(74) *Attorney, Agent, or Firm* — Kilpatrick Townsend & Stockton LLP (57) ABSTRACT

A transaction processor can receive transaction information from a transaction between a customer and a merchant. The transaction information includes an account identifier associated with a financial account of the customer. The processor determines that the account identifier is associated with a fixed price futures contract. The transaction is completed at the current market price. Thereinafter, the processor can determine if the fixed price is lower than the current market price. If the fixed price is lower than the current market price, the process determines the difference in cost for the transaction if the fixed price were used. Then, the processor can create and send a resettlement transaction to the customer's account to reimburse the customer for the difference. As such, the customer receives a simple method for paying for commodities at a set price without having special payment instruments or special accounts.

17 Claims, 7 Drawing Sheets

U.S. PATENT DOCUMENTS

| | | | |
|---|---|---|---|
| 5,220,501 A | 6/1993 | Lawlor et al. | |
| 5,233,167 A | 8/1993 | Markman et al. | |
| 5,367,452 A | 11/1994 | Gallery et al. | |
| 5,408,077 A | 4/1995 | Campo et al. | |
| 5,426,594 A | 6/1995 | Wright et al. | |
| 5,464,971 A | 11/1995 | Sutcliffe et al. | |
| 5,484,988 A | 1/1996 | Hills et al. | |
| 5,491,325 A | 2/1996 | Huang et al. | |
| 5,504,677 A | 4/1996 | Pollin | |
| 5,510,979 A | 4/1996 | Moderi et al. | |
| 5,555,496 A | 9/1996 | Tackbary et al. | |
| 5,577,109 A | 11/1996 | Stimson et al. | |
| 5,622,388 A | 4/1997 | Alcordo | |
| 5,650,604 A | 7/1997 | Marcous et al. | |
| 5,657,201 A | 8/1997 | Kochis | |
| 5,677,955 A | 10/1997 | Doggett et al. | |
| 5,679,940 A | 10/1997 | Templeton et al. | |
| 5,699,528 A | 12/1997 | Hogan | |
| 5,757,917 A | 5/1998 | Rose et al. | |
| 5,794,207 A | 8/1998 | Walker et al. | |
| 5,815,657 A | 9/1998 | Williams et al. | |
| 5,825,617 A | 10/1998 | Kochis et al. | |
| 5,826,241 A | 10/1998 | Stein et al. | |
| 5,828,875 A | 10/1998 | Halvarsson et al. | |
| 5,832,463 A | 11/1998 | Funk | |
| 5,878,211 A | 3/1999 | Delagrange et al. | |
| 5,893,080 A | 4/1999 | McGurl et al. | |
| 5,910,988 A | 6/1999 | Ballard | |
| 5,949,044 A | 9/1999 | Walker et al. | |
| 5,960,412 A | 9/1999 | Tackbary et al. | |
| 5,987,426 A | 11/1999 | Goodwin, III | |
| 6,029,150 A | 2/2000 | Kravitz | |
| 6,030,000 A | 2/2000 | Diamond | |
| 6,032,133 A | 2/2000 | Hilt et al. | |
| 6,032,137 A | 2/2000 | Ballard | |
| 6,039,245 A | 3/2000 | Symonds et al. | |
| 6,058,417 A | 5/2000 | Hess et al. | |
| 6,064,990 A | 5/2000 | Goldsmith | |
| 6,070,798 A | 6/2000 | Nethery | |
| 6,097,834 A | 8/2000 | Krouse et al. | |
| 6,106,020 A | 8/2000 | Leef et al. | |
| 6,119,106 A | 9/2000 | Mersky et al. | |
| 6,122,625 A | 9/2000 | Rosen | |
| 6,149,056 A | 11/2000 | Stinson et al. | |
| 6,164,528 A | 12/2000 | Hills et al. | |
| 6,175,823 B1 | 1/2001 | Van Dusen | |
| 6,193,152 B1 | 2/2001 | Fernando et al. | |
| 6,199,761 B1 | 3/2001 | Drexler | |
| 6,246,996 B1 | 6/2001 | Stein et al. | |
| 6,305,604 B1 | 10/2001 | Ono | |
| 6,308,887 B1 | 10/2001 | Korman et al. | |
| 6,321,984 B1 * | 11/2001 | McCall et al. | 235/381 |
| 6,327,570 B1 | 12/2001 | Stevens | |
| 6,327,575 B1 | 12/2001 | Katz | |
| 6,360,254 B1 | 3/2002 | Linden et al. | |
| 6,367,693 B1 | 4/2002 | Novogrod | |
| 6,484,936 B1 | 11/2002 | Nicoll et al. | |
| 6,539,363 B1 | 3/2003 | Allgeier et al. | |
| 6,547,132 B1 | 4/2003 | Templeton et al. | |
| 6,549,119 B1 | 4/2003 | Turner | |
| 6,827,260 B2 | 12/2004 | Stoutenburg et al. | |
| 6,886,742 B2 | 5/2005 | Stoutenburg et al. | |
| 7,086,584 B2 | 8/2006 | Stoutenburg et al. | |
| 7,606,731 B2 * | 10/2009 | McClung, III | 705/14.34 |
| 7,783,539 B2 | 8/2010 | Martin | |
| 7,813,982 B2 | 10/2010 | Holme et al. | |
| 7,945,500 B2 * | 5/2011 | Fell et al. | 705/36 R |
| 7,945,501 B2 * | 5/2011 | Fell et al. | 705/36 R |
| 2001/0025265 A1 | 9/2001 | Takayasu | |
| 2001/0049651 A1 | 12/2001 | Selleck | |
| 2001/0051876 A1 | 12/2001 | Seigel et al. | |
| 2002/0055907 A1 | 5/2002 | Pater et al. | |
| 2002/0143634 A1 | 10/2002 | Kumar et al. | |
| 2002/0153414 A1 | 10/2002 | Stoutenburg et al. | |
| 2002/0178071 A1 * | 11/2002 | Walker et al. | 705/26 |
| 2003/0033154 A1 * | 2/2003 | Hajdukiewicz et al. | 705/1 |
| 2003/0097321 A1 | 5/2003 | Arikawa et al. | |
| 2003/0197060 A1 * | 10/2003 | Coyner | 235/381 |
| 2004/0098326 A1 | 5/2004 | James et al. | |
| 2004/0153406 A1 | 8/2004 | Alarcon-Luther et al. | |
| 2004/0199421 A1 | 10/2004 | Oda et al. | |
| 2004/0243478 A1 * | 12/2004 | Walker et al. | 705/26 |
| 2004/0260647 A1 | 12/2004 | Blinn et al. | |
| 2006/0015403 A1 * | 1/2006 | McClung, III | 705/14 |
| 2006/0100959 A1 | 5/2006 | Martin | |
| 2006/0149561 A1 | 7/2006 | Govender | |
| 2007/0038553 A1 * | 2/2007 | Miller et al. | 705/37 |
| 2007/0265914 A1 * | 11/2007 | McClung, III | 705/14 |
| 2007/0267479 A1 * | 11/2007 | Nix et al. | 235/379 |
| 2007/0267482 A1 * | 11/2007 | Ruckart et al. | 235/380 |
| 2008/0015964 A1 * | 1/2008 | Shuster | 705/36 R |
| 2008/0052189 A1 * | 2/2008 | Walker et al. | 705/26 |
| 2008/0059318 A1 * | 3/2008 | Packes et al. | 705/20 |
| 2008/0306861 A1 * | 12/2008 | Fell et al. | 705/37 |
| 2009/0070254 A1 * | 3/2009 | Thrush | 705/39 |
| 2009/0299887 A1 * | 12/2009 | Shiran et al. | 705/35 |
| 2010/0042488 A1 * | 2/2010 | Mcclung, III | 705/14.13 |
| 2010/0106611 A1 * | 4/2010 | Paulsen et al. | 705/26 |
| 2010/0306078 A1 * | 12/2010 | Hwang | 705/26.1 |
| 2011/0078090 A1 * | 3/2011 | Peterffy | 705/36 R |
| 2011/0099082 A1 * | 4/2011 | Walker et al. | 705/26.8 |

FOREIGN PATENT DOCUMENTS

| | | |
|---|---|---|
| EP | 0949596 A2 | 10/1999 |
| EP | 1077436 A2 | 2/2001 |
| WO | WO 0046725 A1 | 10/2000 |
| WO | WO 0067177 | 11/2000 |
| WO | WO 0104816 | 1/2001 |
| WO | WO 0205195 A1 | 1/2002 |

OTHER PUBLICATIONS

Confinity, Inc., PayPal.com, How PayPal.com Works, download from website http://www.paypal.com on Feb. 7, 2000, 7 pages.

Dotbank, "The Way to Send and Receive Money on the Internet," download from website http://www.dotbank.com, Feb. 7, 2000, 6 pages.

Idealab Company, "PayMe.com," download from website http://ssl.idealab.com on Feb. 16, 2000, 7 pages.

PR Newswire, "GiftSpot.com Simplifies Gift-Giving on the Internet," Oct. 20, 1999 (abstract), [online] retrieved on May 1, 2002], retrieved from PROQUEST Database, 5 pages.

Tranz 330 Fast, "Low-Cost Transaction Automation At the Point of Service," http://www.vfi-finance.com/tranz330.htm, VeriForne Finance, pp. 1-3, especially pp. 1-2, Jan. 1999.

x.com, "Do More with Your Money," download from website http://www.x.com., 5 pages, Feb. 7, 2000.

* cited by examiner

SYSTEMS AND METHODS FOR PRE-PAID FUTURES PROCUREMENT

CROSS-REFERENCES TO RELATED APPLICATIONS

This application is related to non-provisional U.S. patent application Ser. No. 11/764,324, filed Jun. 18, 2007 by Gary M. Holme et al. and entitled "Unit-Based Prepaid Presentation Instrument Accounts and Methods," which is a continuation-in-part of U.S. patent application Ser. No. 11/283,532, filed Nov. 18, 2005, entitled "Derivative Currency-Exchange Transactions," which is a continuation-in-part of U.S. patent application Ser. No. 10/984,354, filed Nov. 8, 2004, entitled "Methods And Systems For Implementing Derivative Transactions," the entire disclosures of which are incorporated herein by reference for all purposes.

BACKGROUND

Many businesses require goods to maintain operations. Some of those goods may be commodities, which are articles of commerce. For example, UPS™ may require millions of gallons of gasoline to continue operating the company's fleet of delivery vans. Gasoline is just one example of a commodity.

Unfortunately, the pricing of commodities, like gasoline, is very volatile. The price of the commodity can vary significantly in a short period of time. This volatility in pricing makes budgeting and paying for the commodities very difficult. Some companies may take a conservative approach and assume the prices will remain at high levels. Unfortunately, this method requires the company to keep great sums of cash on hand to pay for the gas when those funds could be used more effectively in other ventures. Other companies may be more liberal and risk not having the cash available to pay for the purchased commodity. These problems affect the profitability and effectiveness of businesses that rely on commodity purchases to do business.

BRIEF SUMMARY

Embodiments disclosed herein generally include systems and methods for providing fixed price futures contracts that are paid through an electronic account. A business or other party negotiates a contract to purchase a commodity at a fixed price. As part of the contract, the business receives an electronic account having one or more payment instruments, for example "credit cards," to use to pay for the commodity. When purchasing the commodity, the business personnel use the payment instrument.

An account identifier associated with the electronic account and recorded on the payment instrument is sent to a processor. The processor determines that the account identifier is associated with a price fixed futures contract. The transaction is completed at the current market price. Thereinafter, the processor can determine if the fixed price is lower than the current market price. If the fixed price is lower than the current market price, the process determines the difference in cost for the transaction if the fixed price were used. Then, the processor can create and send a resettlement transaction to the business to reimburse the business for the difference. As such, the business receives a convenient method for determining a set price for commodities to be purchased. Further, with the payment instruments, the business is provided a simple method for paying for the commodities at the set price without having special payment instruments or special accounts.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Before describing the systems and methods in detail, an example is herein provided to clarify the embodiments hereinafter described. A business, such as UPS™, may require millions of gallons of gasoline a week to operate the company's over 90,000 ground vehicles. A change in gas prices of a mere $0.10 means a difference in millions of dollars to the operations of UPS. To maintain a known cost for the gasoline that UPS uses, UPS may contract with British Petroleum (BP) to buy all the company's gas from BP at a fixed price. For example, UPS would pay a set $2.15 per gallon for gas the company buys from BP. The fixed price contract can have other terms. For example, the other terms could include the number of gallons that can be purchased at this price, the requirement that the gas be purchased only at BP gas stations, the requirement that the gas be purchased only in a predetermined geographic area, the term of the fixed price contract, etc.

In previous futures contracts, the purchaser may be required to pay for all the future goods up front, This requirement would necessitate an enormous cash outlay. In other contracts, the purchaser may be required to take possession of all the goods at a future date requiring storing the goods at some point. Further, a purchaser may receive a stored value card having some amount of "goods" associated with the stored value card. For example, the purchaser would have a card equivalent to 1,000 gallons of gas. All of these methods of executing the futures contract are fraught with problems. Paying for millions of gallons of gas could require a billion dollar cash outlay. Storing the millions of gallons of gas would require enormous storage infrastructure facilities that would cost millions of dollars. Finally, at a customer level, the stored value cards can be difficult to use at different locations or when the value on the stored value card was depleted.

Present embodiments provide the business, such as UPS, with an account similar to a credit or debit account. This account is associated with the fixed price futures contract. Either through BP or a separate financial institution working with BP, UPS is issued payment instruments, e.g., credit cards, radio frequency identification (RFID) smart cards, etc., that can be used to purchase the gas. UPS gives the payment instruments to their drivers. When the driver needs gas, the driver purchases the gas at a BP station with the payment instrument. For example, the drive pays 50 dollars to purchase 20 gallons of gas at $2.50 per gallon.

The transaction information for the gas purchase is sent from the point-of-sale device, e.g., the credit card machine at the gas pump, to a processor. The transaction information can include information about the transaction. For example, the transaction information can include the price per gallon, the number of gallons purchased, the total cost of the transaction, the location of the BP station, the date, the identifier of the merchant, the account identifier associated with the UPS account, etc. The processor reads the account identifier and determines that the transaction is associated with the UPS account and the fixed price contract. The processor then settles the transaction as normal. In other words, the transaction is approved and money is sent from the UPS account to BP's financial institution.

At some time during or after the settlement of the transaction, the processor determines if the price per gallon received with the transaction information is higher than the fixed price annunciated in the fixed price contract. For example, the processor compares the $2.50 per gallon paid at the pump to the $2.15 fixed price. With the price paid at the pump higher, the processor determines the difference in the cost of the transaction had the fixed price been used. Here, the difference is $0.35 per gallon ($2.50 per gallon minus $2.15 per gallon) multiplied by 20 gallons (the number of gallons purchased) or $7.00. The processor creates a resettlement transaction for $7.00 that is sent to BP's financial institution to refund or reimburse UPS for the extra cost. As such, UPS is provided gas at the fixed price but uses the simple payment instrument to make the transaction easy to complete.

Figure 1:
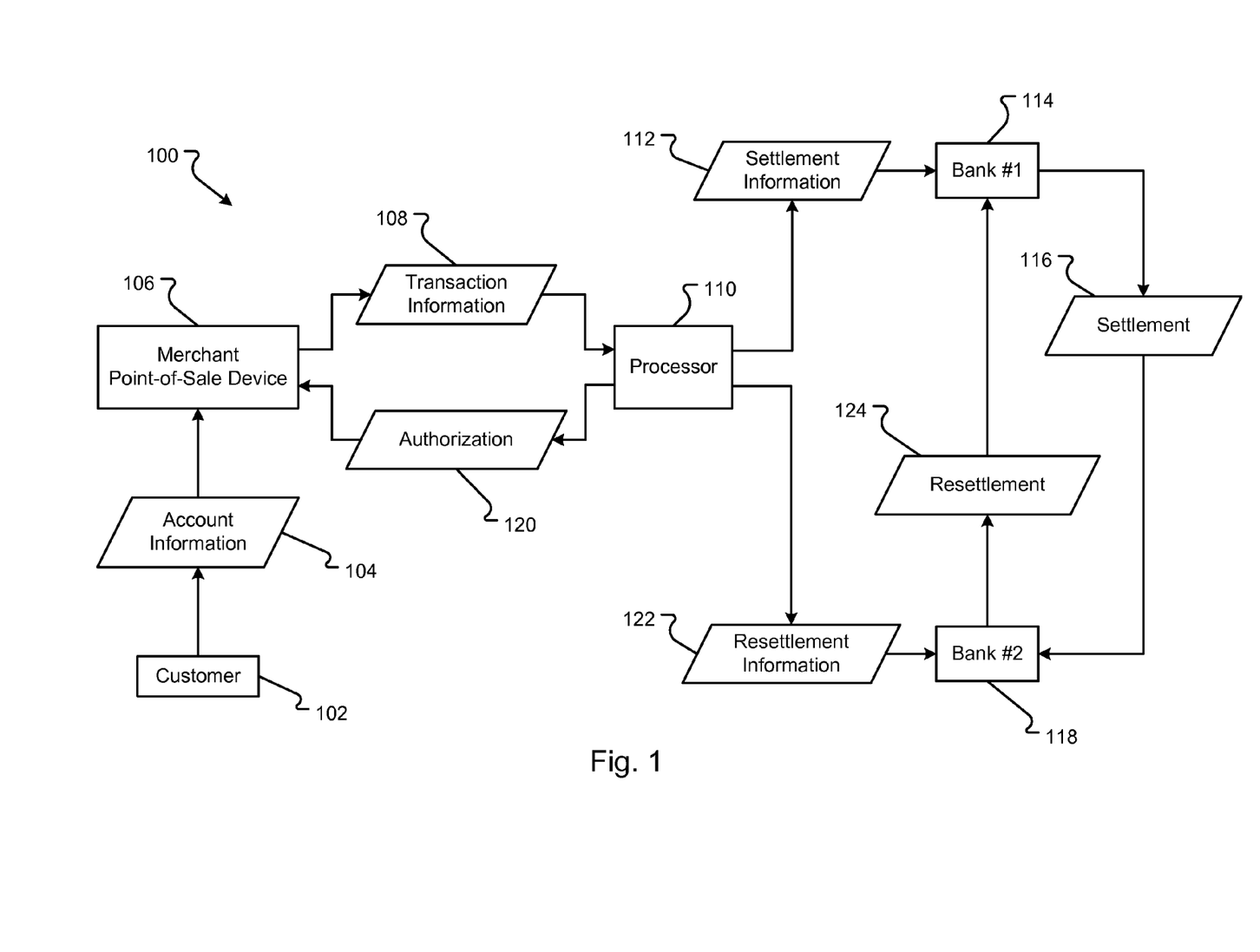
FIG. 1 is a block diagram of an embodiment of a system operable to process transactions associated with one or more fixed price futures contracts.

An embodiment of a transaction system 100 for completing transactions associated with fixed price futures contracts is shown in FIG. 1. The components in the transaction system 100 can be computer systems as described in conjunction with FIG. 7. Thus, each component can include hardware and/or software configured to or operable to complete the tasks described herein. Further, the components described in FIG. 2 and in other figures can be in communication with each other. "In communication" means electrically connected or coupled through one or more systems or device allowing for the exchange of signals and/or data.

A customer 102 can purchase a commodity or other good from a merchant at a point-of-sale device (POS) 106. The customer 102 can be associated with a business or organization that has contracted to purchase the commodity under a fixed price futures contract (also referred to simply as a fixed price contract). As part of the contract, the customer 102 may receive a payment instrument. The payment instrument can be any type of device or article that has recorded thereon account information for the customer. For example, the payment instrument is a VISA credit card having the account identifier embossed on the front of the card and encoded onto a magnetic strip on the back of the card. A smart card or other near field communication device (e.g., an RFID device) may also be used, for example, a PayPal™ device.

During the transaction, the customer 102 presents the payment instrument to provide account information 104 to the merchant POS 106. For example, the customer swipes the magnetic strip on the credit card in a credit card device at the merchant POS device 106. The account information can include at least one of, but is not limited to, the customer's identity, the customer's address, the customer's personal identification number (PIN), the account identifier associated with the customer's account, etc. The merchant POS device 106 combines some or all of the account information with transaction information into a transaction information message 108. The transaction information can include at least one of, but is not limited to, the price per unit of the good, the number of goods purchased, the total cost of the transaction, the location of the merchant POS, the date, the time, etc. After writing the account information and/or transaction information into an electronic message, e.g., a data packet, the merchant POS 106 addresses the transaction information message 108 to a processor 110 and sends the transaction information message 108 to the processor 110.

In response to receiving the transaction information message 108, the processor 110 creates a settlement message 112 with information for settling payment for the transaction. The settlement message 112 is sent to bank #1 114, which is associated with the customer and the customer's account. Bank #1 114 sends a settlement 116 to bank #2 118, which is associated with the merchant, to settle payment for the transaction. In other words, bank #1 114 electronically transfers money, in the settlement 116, to bank #2 118 to pay for the transaction. In embodiments, the settlement 116 may be a wire transfer, an ACH transfer, a mailed check, a cash transfer, etc. The processor 110, in embodiments, may also determine possibility for payment before sending the settlement information 112. For example, the processor determines that the customer 102 has sufficient funds or available credit in bank #1 114 to pay for the transaction. In other embodiments, the processor 110 authenticates the customer 102 to ensure this transaction is legitimate. Regardless, the processor 110 can send an authorization 120 to the merchant POS 106 that allows the merchant POS 106 to complete the transaction.

The processor 110 can also complete a determination if the transaction is associated with a fixed price contract. From the transaction information 108, the processor 110 reads the account identifier. If at least a portion of the account identifier is associated with a fixed price contract, and/or the merchant location is included in the terms of the contract, the processor 110 determines if there would have been a difference in cost for the transaction if the fixed price were used in the transaction. Thus, the processor 110 determines if the price per unit in the transaction is higher or possibly lower than the fixed price in the fixed price contract. If there was a difference, the processor 100 can determine the difference and create a resettlement message 122 for the difference. The processor 110 sends the resettlement message 122 to the merchant's bank #2 118 to reimburse the customer. Bank #2 118 sends a resettlement 124 for the difference to the customer's bank #1 114. The resettlement 124 may be constructed and sent in a similar manner to the settlement 116. Alternative embodiments within the scope of the attached claims are considered, some of which will be explained hereinafter.

Figure 2:
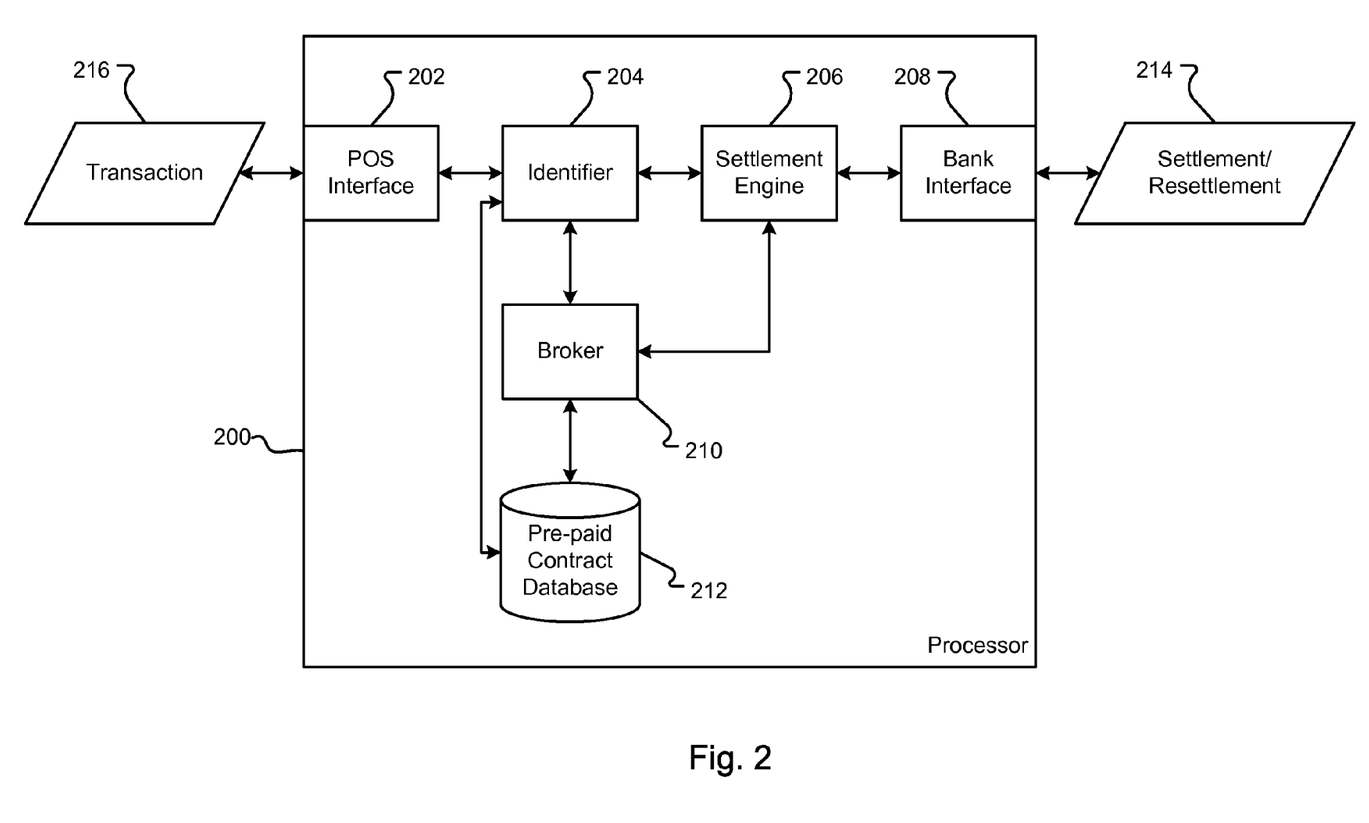
FIG. 2 is a block diagram of an embodiment of a processor operable to identify and resettle transactions associated with one or more fixed price futures contracts.

An embodiment of a processor 200 operable to complete a transaction associated with a fixed price contract is shown in FIG. 2. Processor 200 may be the same or similar to processor 110 (FIG. 1). The components in the processor 200 can be hardware and/or software configured to or operable to complete the tasks described herein. A processor 200 can include one or more of, but is not limited to, a POS interface 202, an identifier component 204, a settlement engine 206, a bank interface 208, a broker 210, and/or a pre-paid contract database 212.

The POS interface 202 can receive transaction information 216 from one or more merchant POS devices over a network. Thus, the POS interface 202 may receive, read, translate, parse, or process in some way the transaction information 216. After processing the transaction information 216, the POS interface 202 can send the information to the identifier component 204. The POS interface may also be configured to send information back to the merchant POS. For example, the POS interface can send an authorization message to the merchant POS.

An identifier component 204 (or simply referred to as the identifier) determines that the transaction, associated with the transaction information 216, is related to or associated with a fixed price contract. To accomplish the identification, the identifier 204 reads at least a portion of the account identifier in the transaction information 216. The entire account identifier may be compared to a table of account identifiers stored in the pre-paid contract database 212. In addition, the merchant location identified by a merchant identifier of the transaction may be compared to a table of merchants that is associated with the contract. If the account identifier is located in the pre-paid contract database 212 and/or the merchant location matches a merchant ID in the merchant identifier table, the identifier 204 sends the transaction information to the broker 210. Otherwise, the transaction is completed as normal by the settlement engine 206. In other embodiments, a portion of the account identifier identifies the account identifier as being associated with a pre-paid contract. For example, a reserved set of four digits in a sixteen digit account number may signify that the account identifier is associated with a pre-paid contract. The account identifier is explained further in conjunction with FIGS. 3A-C.

The identifier 204 forwards transaction information 216 from each transaction to the settlement engine 206. The settlement engine 206 completes a settlement message 214. The settlement message 214 is the same or similar to settlement information 112 (FIG. 1). The settlement message 214 includes any and all information required to affect payment for the transaction. The settlement message 206 sends the settlement message 214 to the bank interface 208.

The bank interface 208 can transmit the settlement message 206 to one or more banks over a network. Thus, the bank interface 208 may transmit, compose, write, arrange, encrypt, or process in some way the settlement message 206. After processing the settlement message 206, the bank interface 208 can send the information to the bank. The bank interface 208 may also be configured to receive information from the banks. For example, the bank interface 208 can receive a confirmation message that the settlement has been completed and the transaction paid.

The broker 210 receives the transaction information 216 for transactions associated with pre-paid contracts. The broker 210 can read information about the price fixed, pre-paid contracts from the pre-paid contract database 212. To ensure the terms of the pre-paid contract are satisfied, the broker 210 can compare one or more items of information in the transaction information 216 with related information in the fixed price contract stored in the pre-paid contract database 212. For example, the broker 210 can compare the price for the transaction with the fixed price. If the fixed price is lower, the broker 210 can determine the difference in cost for the transaction if the fixed price were used. This difference can be sent to the settlement engine 206 to create and send a resettlement message 214.

Another term that the broker 210 may review is the date of the transaction to ensure the transaction is associated with an active fixed price contract. The broker 210 may determine if the merchant is part of a merchant file that contains merchants associated with the fixed price contract. Further, the broker 210 can determine and store information for each transaction in the pre-paid contract database 212. For example, the broker 210 can store the number of units that have been purchased under the fixed price contract. If the fixed price contract includes a provision about the maximum number of units to be sold under the contract, the broker 210 can check the number of units sold to date to determine that the current transaction can be processed under the limit. There may be other checks and determinations completed by the broker 210 to ensure the transaction should be associated with a fixed price contract.

Figure 3A:
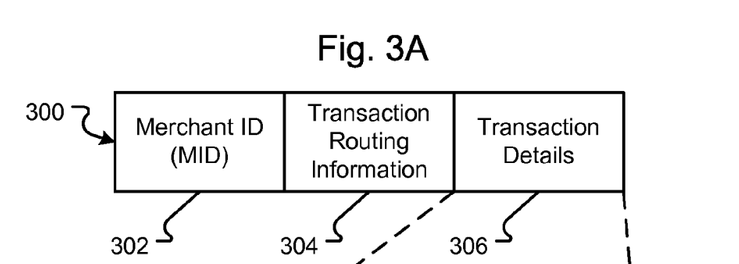
FIGS. 3A-C are embodiments of data structures for communicating information associated with transactions associated with one or more fixed price futures contracts.

An embodiment of a data structure 300 for transporting transaction information from the merchant POS device 106 (FIG. 1) to the processor 110 (FIG. 1) is shown in FIG. 3A. The data structure 300, in embodiments, includes fields that cause a computer system to perform one or more actions. The fields can include one or more of, but are not limited to, a merchant identifier (MID) field 302, a transaction routing information field 304, and/or a transaction details field 306. The MID field 302 includes an identifier for the merchant associated with the merchant POS 106 (FIG. 1). The MID 302 may include a globally unique identifier (GUID) or other identifier that allows the processor 110 (FIG. 1) to recognize where the settlement information 112 is destined to be sent. The transaction routing information 304 includes information that allows the processor 110 (FIG. 1) to route the settlement information 112 (FIG. 1) to the merchant bank 114 (FIG. 1).

Figure 3B:
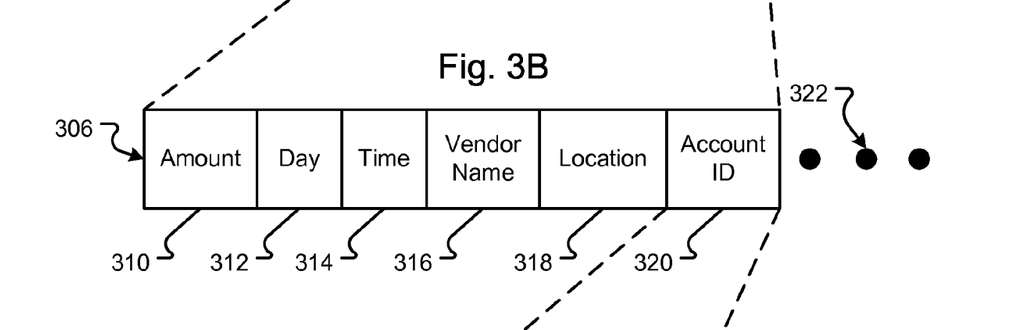
Figure 3C:
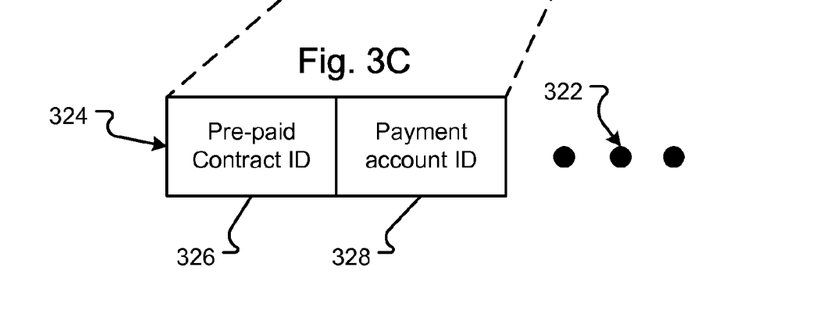

The transaction details field 306 includes one or more fields containing information about the transaction as shown in FIG. 3B. In embodiments, the transaction details 306 includes at least one of, but is not limited to (as represented by the ellipses 322), an amount field 310, a day field 312, a time field 314, a vendor name field 316, a location field 318, and/or a retailer identifier (RID) field 320. The amount field 310 includes the amount that needs to be paid to complete the transaction. The amount field 310 can also include data for a number of units purchased and a price per unit. The day field 312 includes the day the transaction occurred. The time field 314 includes the time the transaction occurred. The vendor name field 316 includes the name of the vendor that owns or operates the merchant POS 106 (FIG. 1). For example, the vendor name may be the name of the gas station that is selling the gas. The location field 318 includes the location of the merchant POS 106 (FIG. 1). For example, the location field 318 includes the street address (e.g., 1993 Elm St., Potsdam, N.Y.) where the gas station is located. The account ID field 320 provides an identifier for the account associated with the customer 102. The account ID may be a GUID or other identifier that uniquely identifies the customer's account. An embodiment of the account ID 324 is shown in FIG. 3C.

In embodiments, the account identifier 324 can include one or more of, but is not limited to (as represented by the ellipses 322), a pre-paid or fixed price contract identifier field 326 or a payment account identifier 328. The pre-paid contract identifier field 326 can be a portion of the account identifier 324 or may represent the entire account identifier 324. The pre-paid contract identifier field 326 identifies the account identifier 324 as being associated with a fixed price futures contract. If the pre-paid contract identifier field 326 is a portion of the entire account identifier 324, then the portion of digits may be a standard identifier for all accounts associated with a fixed price contract. The pre-paid contract identifier field 326 can be any number of digits, in any location in the account identifier 324, and with any combination of digits. For example, if the sixteen digit account identifier 324 for a credit card has the first four digits of "1111," then this account identifier 324 may be recognized as being associated with a fixed price contract. In other embodiments, the entire account identifier 324 is compared to identifiers associated with fixed price contracts.

The payment account identifier 328 identifies the account from which the settlement 116 (FIG. 1) is to be sent. Thus, the payment account identifier 328 identifies an account at the bank 114 that will have funds withdrawn or deposited for the transaction. As with the pre-paid contract identifier field 326, the payment account identifier 328 can be any number of digits, in any location in the account identifier 324, and with any combination of digits.

In still another embodiment, other contract terms are checked to ensure that the resettlement should occur. For example, the merchant identifier 302 may be checked against a merchant file associated with the fixed price contract. If the merchant identifier 302 is not included in the file, then no resettlement is conducted. As such, the fixed price contract can motivate customers to use certain merchants. Further, the location of the merchant can be checked, the total units sold under the fixed price contract, the termination date for the fixed price contract, etc. As such, the resettlement process can be further defined to motivate the customer to act in certain ways to the benefit of the merchant.

Figure 4:
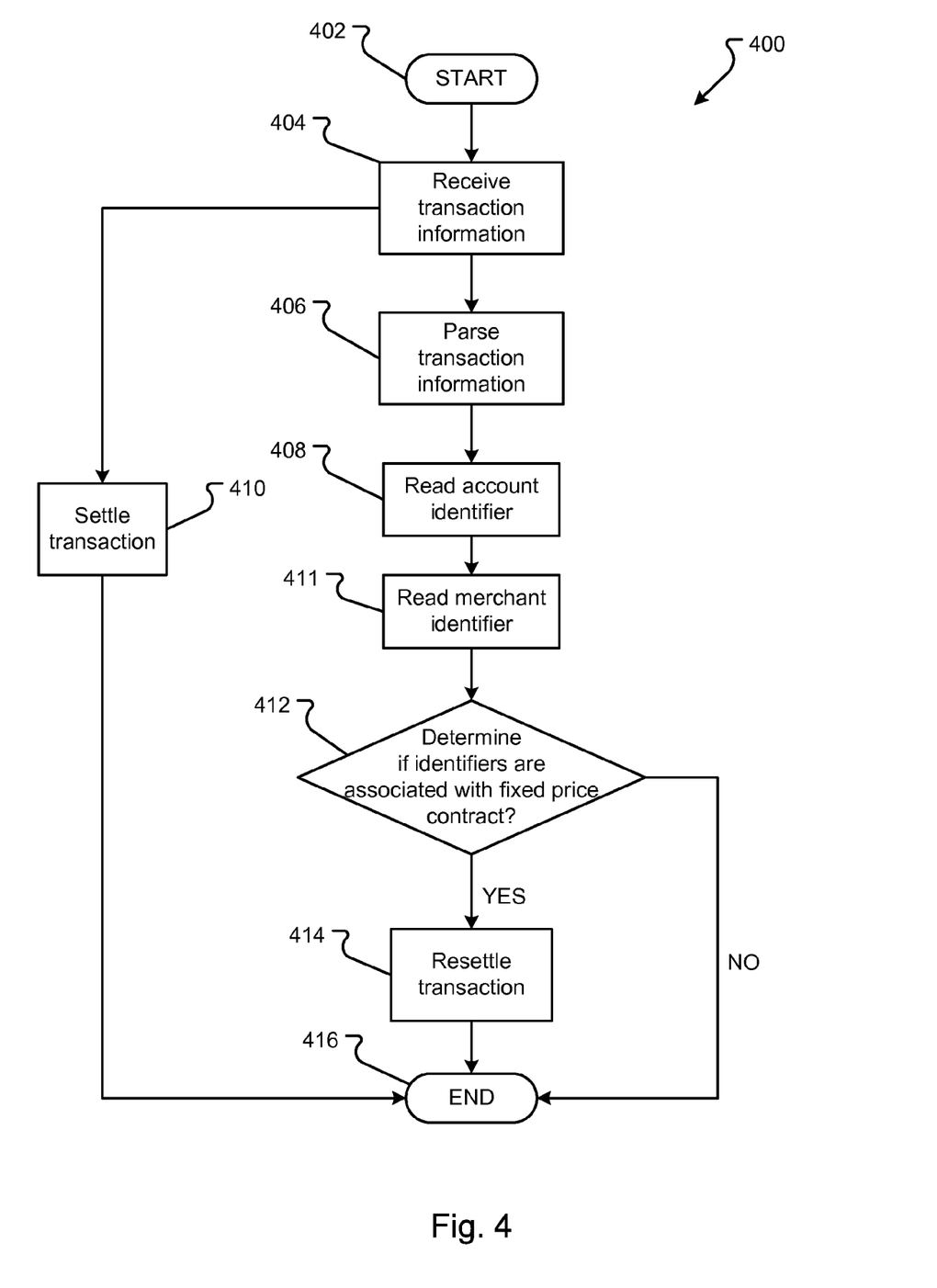
FIG. 4 is a flow diagram of an embodiment of a process for identifying and resettling transactions associated with one or more fixed price futures contracts.

An embodiment of a method 400 executed at a processor 200 (FIG. 2) for processing a transaction associated with a fixed price contract is shown in FIG. 4. In embodiments, the method 400 generally begins with a START operation 402 and terminates with an END operation 416. The steps shown in the method 400 may be executed in a computer system as a set of computer-executable instructions. While a logical order is shown in FIG. 4, the steps shown or described can, in some circumstances, be executed in a different order than presented herein. The method 400 is explained herein with reference to FIGS. 1-3C.

A customer 102 contracts with a party for a fixed price contract. The party issues to the customer 102 a payment instrument, for example, a credit card. An account number recorded on the payment instrument can identify the payment instrument as being associated with the fixed price contract. When the customer purchases a commodity at a merchant POS device 106, the customer 102 presents the payment instrument to provide the merchant POS device 106 with account information 104. The merchant POS device 106 combines the account information 104 with information about the transaction into a transaction information message 108. After creating the transaction information message 108, the merchant POS device 106 sends the transaction information message 108 to a processor 110. The POS interface 202 of the processor 110 receives the transaction information message 108 in step 404.

An identifier 204 forwards the transaction information from the transaction information message 108 to the settlement engine 206. The settlement engine 206 creates a settlement information message 112 and sends the settlement information message 112 to the bank interface 208. The bank interface, in turn, sends the settlement information message 112 to bank #1 114 to settle the transaction in step 410. A transfer of funds in a settlement 116 from bank #1 114 to bank #2 118 settles the transaction.

Contemporaneously or nearly simultaneously with the settlement, the identifier 204 also parses the transaction information message 300 in step 406. The identifier 204, thus, locates the transaction details 306 in the transaction information message 300. Upon locating the proper field, the identifier 204 reads the account identifier field 320 in step 408 and the merchant identifier 302 in step 411. The pre-paid contract identifier 326 is determined from the account identifier 324. The identifier 204 determines if the identifiers are associated with a fixed price contract in step 412.

To accomplish the determination, the identifier 204 may determine if the pre-paid contract identifier 326 is located in the account identifier 324 or the MID 302 is associated with the contract. In other words, the identifier looks for a predetermined and reserved set of digits identifying the identifiers as being associated with a fixed price contract. For example, does the account identifier 324 include the code "1111" as the first four digits that signify that the account identifier 324 is associated with a fixed price contract? In another embodiment, the identifier 204 reads a table in the pre-paid contract database 212 that includes an ordered list of identifiers associated with fixed price contracts. The identifier 204 determines if the identifiers provided in the transaction information message 300 are in the list.

If the identifiers are not associated with a fixed price contract, the method 400 flows NO to end operation 416. However, if and when the identifiers are associated with a fixed price contract, the method 400 flows YES to step 414. Here, the identifier 204 sends the transaction information to the broker 210. The broker 210 determines if a resettlement is necessary for the transaction. When a resettlement is necessary, the broker 210 sends the resettlement information to the settlement engine 206 to create a resettlement information message 122. The resettlement information message 122 is sent to bank #2 118 which reimburses the customer 102 by sending a payment in a resettlement 124 to bank #1 114.

Figure 5:
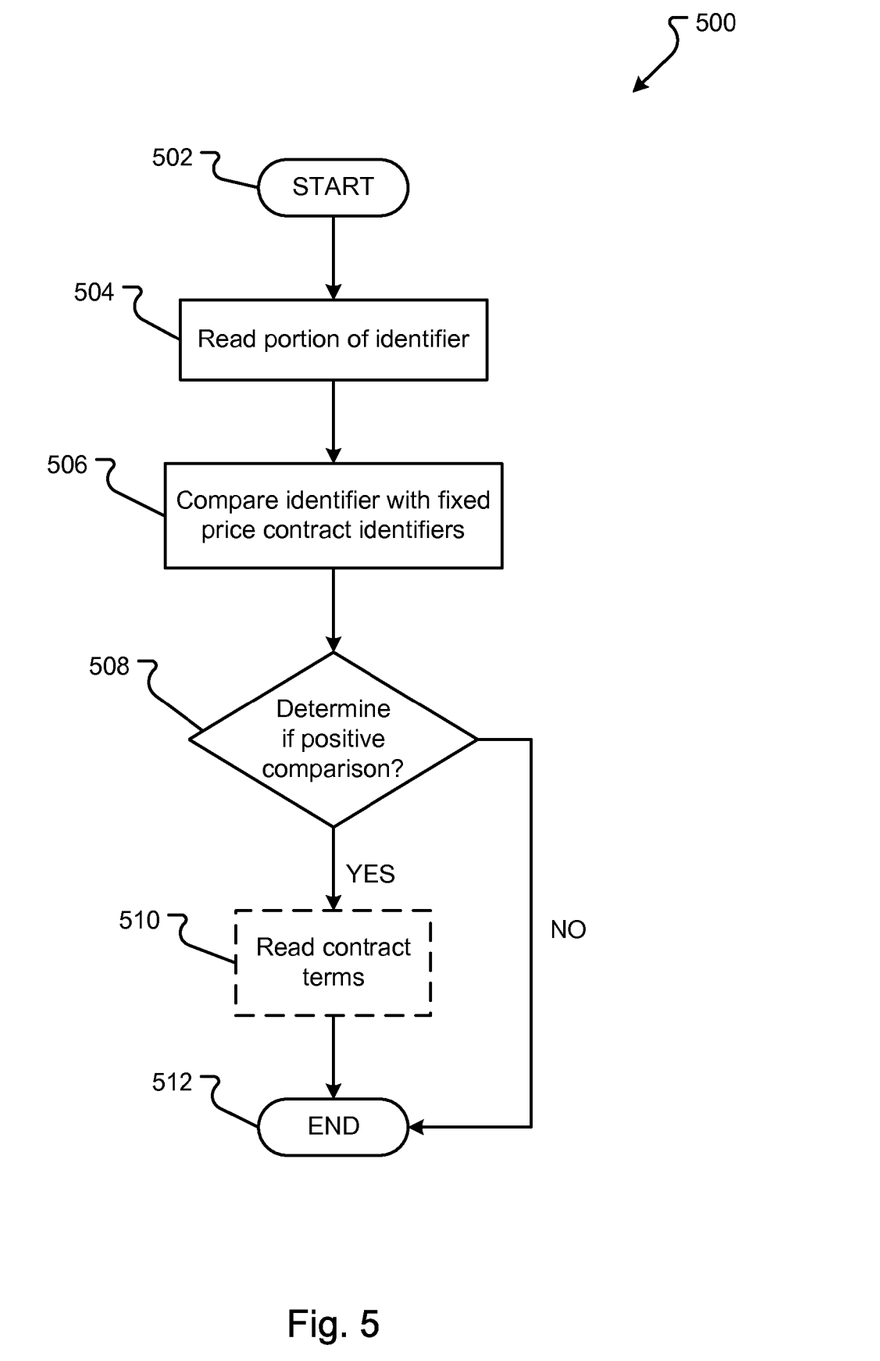
FIG. 5 is a flow diagram of an embodiment of a process for identifying transactions associated with one or more fixed price futures contracts.

An embodiment of a method 500 executed at a processor 200 (FIG. 2) that better details the identification of an account identifier 324 associated with a fixed price contract is shown in FIG. 5. In embodiments, the method 500 generally begins with a START operation 502 and terminates with an END operation 512. The steps shown in the method 500 may be executed in a computer system as a set of computer-executable instructions. While a logical order is shown in FIG. 5, the steps shown or described can, in some circumstances, be executed in a different order than presented herein. The method 400 is explained herein with reference to FIGS. 1-3C.

The identifier 204 reads at least a portion of the account identifier 324 received in the transaction details 306 of the transaction information message 108 in step 504. For example, the identifier 204 reads only the pre-paid contract identifier 326. The identifier 204 may then compare the pre-paid contract identifier 326 with identifiers for fixed price contracts in step 506. Every fixed price contract may have the same identifier signifying that the contract is a fixed price contract. In alternatives, the identifier 204 compares the pre-paid contract identifier 326 to an identifier for each fixed price contract.

In response to the comparison, the identifier 204 determines if a positive comparison is made. If the pre-paid contract identifier 326 matches the identifier for at least one fixed price contract identifier, there is a positive comparison. A non-positive comparison causes the method 500 to flow NO to end operation 512. However, if there is a positive comparison, the method 500 flows YES where the identifier 210 can optionally read one or more contract terms for the fixed price contract in step 510. The identifier 210 can read the contract terms from the identified fixed price contract stored in the pre-paid contract database 212. These contract terms and the transaction information can be passed to the broker 210 for further processing.

Figure 6:
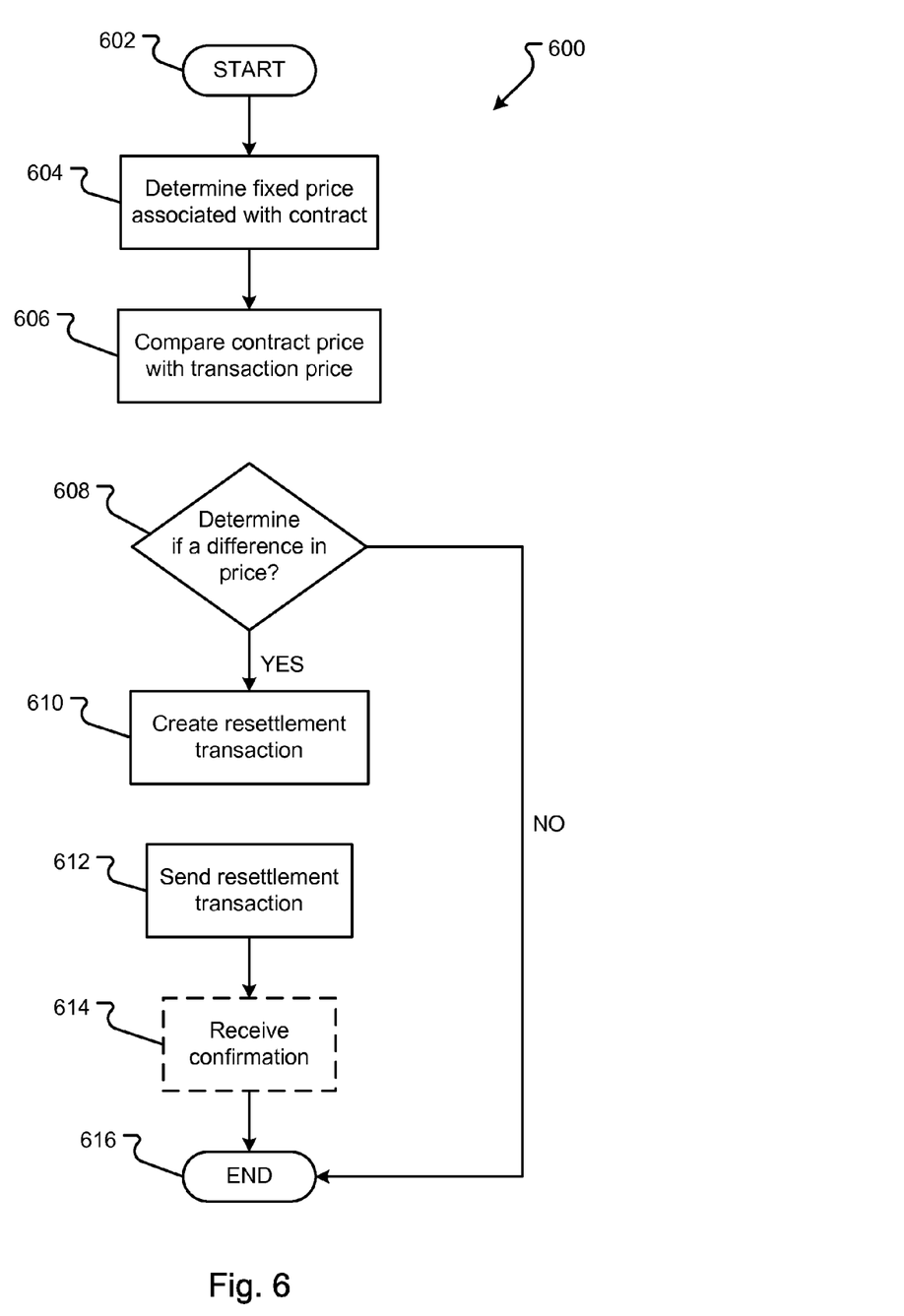
FIG. 6 is a flow diagram of an embodiment of a process for resettling transactions associated with one or more fixed price futures contracts.

An embodiment of a method 600 executed at a processor 200 (FIG. 2) that better details the resettlement process is shown in FIG. 6. In embodiments, the method 600 generally begins with a START operation 602 and terminates with an END operation 616. The steps shown in the method 600 may be executed in a computer system as a set of computer-executable instructions. While a logical order is shown in FIG. 6, the steps shown or described can, in some circumstances, be executed in a different order than presented herein. The method 600 is explained herein with reference to FIGS. 1-3C.

After the identifier 204 identifies the fixed price contract, the broker 210 receives the information about the fixed price contract and the transaction information 306. The broker 210 may receive the contract information from the identifier 204 or may read the information from the pre-paid contract database 212. From the information, the broker 210 can determine the fixed price associated with the contract in step 604. The broker 210 can then read the price paid during the transaction from the amount field 310.

The broker 210 compares the contract price with the transaction price in step 606. For example, the broker 210 compares a $3.00 per unit price in the transaction information 306 with a $2.50 per unit price in the contract. The broker 210 then determines if there is a difference in the prices in step 608. In embodiments, the broker 210 determines if the transaction price is higher than the contract price. If there is no difference in price, the method 600 flows NO to end operation 616. However, if there is a difference in price, the method 600 flows YES to where the broker 210 creates a resettlement transaction in step 610.

A resettlement transaction is a reimbursement to the customer 102 for the overage the customer 102 pays. For example, if there is an overage of $0.50 per unit between the contract price and the transaction price, the broker 210 can determine a difference in cost for the transaction if the contract price would have been used. For example, the broker 210 multiplies the overage amount, e.g., $0.50, by the number of units purchased as disclosed in the amount field 310, e.g., 100 units. The difference, e.g., $50.00, is the amount changed back in the resettlement.

The broker 210 sends the difference amount and other information, the account identifiers for the merchant and customer, the routing information, etc., to the settlement engine 206. The settlement engine 206 creates the resettlement information message 122 and forwards the resettlement information message 122 to the bank interface 208. The bank interface 208 sends the resettlement information message 122 to the bank #2 118 in step 612. Optionally, the bank #2 118 sends and the bank interface 208 receives a confirmation for the resettlement in step 614.

Figure 7:
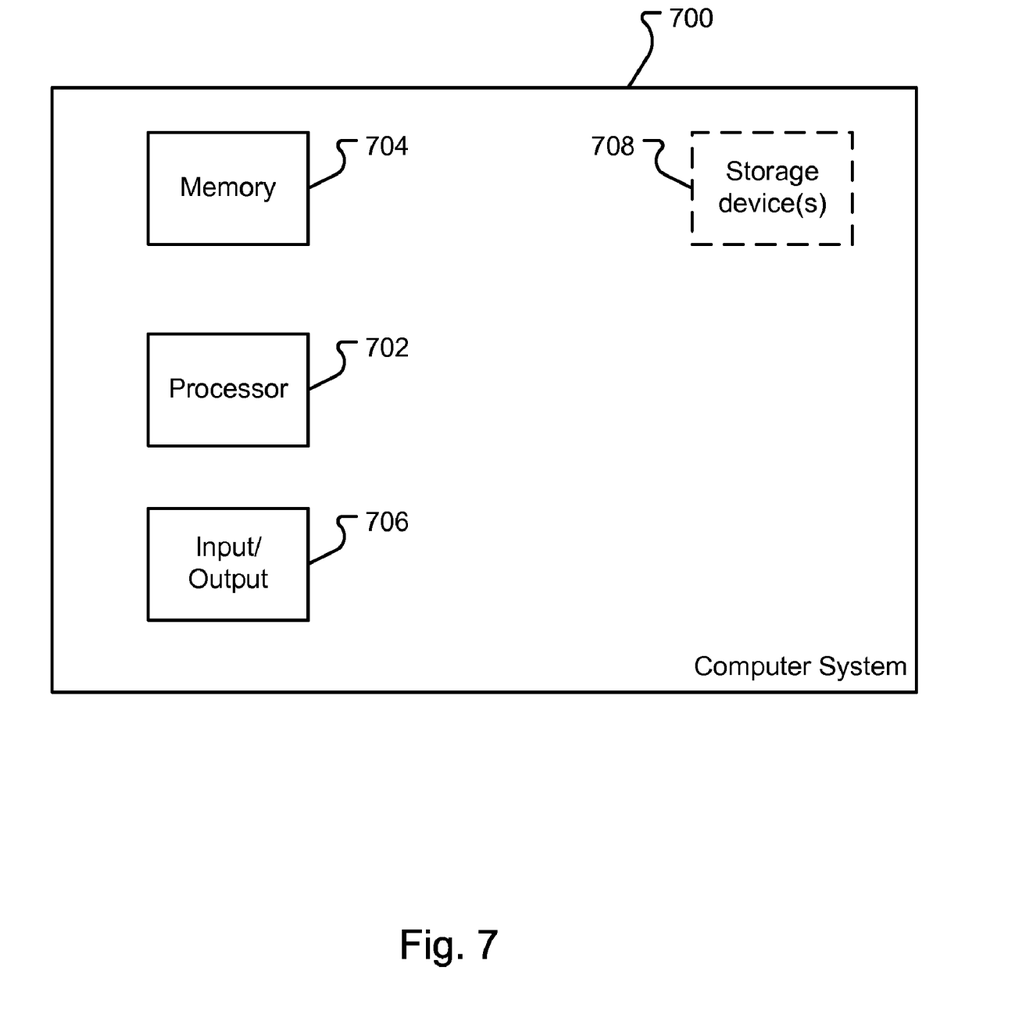
FIG. 7 is a block diagram of an embodiment of a computing system operable to function in one or more embodiments presented herein.

Embodiments of the different systems represented in this disclosure, which may include the merchant POS 106 (FIG. 1), the processor 110 (FIG. 1), or the systems for bank #1 114 (FIG. 1) or bank #2 118 (FIG. 1), may be a computer system, such as computer system 700 shown in FIG. 7. While a basic computer system is shown, one skilled in the art will recognize the configuration changes and/or modifications that may be required to make operable the systems (e.g., merchant POS 106 (FIG. 1), the processor 110 (FIG. 1), the systems for bank #1 114 (FIG. 1) or bank #2 118 (FIG. 1), etc.) described herein. The computer system 700 comprises a processor 702, which completes the operations described in conjunction with FIGS. 3 through 5 or makes the systems operable as described in conjunction with FIGS. 1 and 2. Further, the computer system 700 can execute functions in response to receiving the data structures described in FIGS. 3A-C. The processor 702 may be any type of processor operable to complete the operations or implement the systems described herein. For example, the processor 702 may be an Intel Pentium processor, an ASIC, an FPGA, or other device.

The computer system 700 also comprises memory 704 to hold data or code being executed by processor 702. The memory 704 may permanently or temporarily store the instructions described in conjunction with FIGS. 4 through 6 or the data elements described in conjunction with FIGS. 3A-C. Memory may be classified as a computer-readable medium, for example, RAM, ROM, magnetic media, optical media, etc.

The computer system 700 also can comprise software elements, including an operating system and/or other code, such as one or more application programs for the processor 110 (FIG. 1) to resettle transactions associated with fixed price futures contracts. The application programs may comprise computer programs described herein, and/or may be designed to implement methods described herein and/or configure systems described herein. Merely by way of example, one or more procedures described with respect to the method(s) discussed in conjunction with FIGS. 4 through 6 might be implemented as code and/or instructions executable by the computer system 700 (and/or the processor 702 within the computer system 700).

A set of these instructions and/or code might be stored on a computer-readable storage medium, such as the storage device(s) 708 or memory 704. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

Further embodiments of the computer system 700 comprise input/output (I/O) modules of systems 706. I/O systems 706 may include displays such as LCDs, plasma screens, cathode ray tubes, etc. The displays can provide a visual representation of data to a user. I/O system 706 may also include input devices such as mice, keyboards, touch screens, etc. Input devices allow the user to input information into the computer system. I/O systems 706 may also comprise communication systems such as wired, wireless, or other communication systems. Further, communication systems may communicate with peripheral devices, such as printers, modems, or other devices.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. In some embodiments, a computing system may be used to execute any of the tasks or operations described herein. In embodiments, a computing system includes memory and a processor and is operable to execute computer-executable instructions stored on a computer-readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "computer-readable medium" or "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels and various other mediums capable of storing, containing or carrying instruction(s) and/or data.

Embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A number of variations and modifications of the invention can also be used. For example, the relationship between the merchant and the customer may include a third party. For example, a futures trader may contract with the customer for the fixed price on the commodity. Thereinafter, the third party can have an associated financial institution provide the account and payment instrument. Herein, the settlement and resettlement processes become more complex. A settlement may still occur, but the merchant bank may pay the third party for the commodity. Further, the third party may resettle with the customer for overages. Thus, the resettlement messages are not sent to the merchant bank but to the third party's bank that sends the resettlement to the customer. One skilled in the art will recognize the changes to the structure of the embodiments to effectuate the inclusion of a third party broker.

Further, the processor 110 may process numerous resettlements over a predetermined period of time, for example, a day. Instead of separately resettling each transaction, the processor 110 may create a batch file for resettlements. The batch file can be organized to make the resettlement process more efficient. For example, all resettlements associated with a particular merchant or customer can be batched together. As such, payments can be made in bulk from a merchant or to a customer. The batch files may be sent at predetermined intervals, e.g., every day, every hour, etc. Thus, when the payment networks are less busy, such as in the night, the resettlements can be processed to make the payment network less busy and faster.

In light of the above description, a number of advantages of the present invention are readily apparent. For example, the customer is offered a method for receiving a fixed price for commodities. This fixed price allows customers to have steady costs and budgets. Further, the payment instrument allows easy payment and access to the commodities. The merchants are provided with guaranteed demand and revenue. Further, the merchants can modify the contracts to motivate certain behavior from the customers, e.g., purchasing from certain merchants, in certain locations, during certain dates, etc. Also, third parties can sell and trade these fixed priced contracts. Thus, the present system and methods provide a motivation to create commodity markets that can generate fees and money for traders and brokers.

While the principles of the invention have been described above in connection with specific apparatuses and methods, it is to be clearly understood that this description is made only by way of example and not as limitation on the scope of the invention.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

What is claimed is:

1. A settlement processor system for processing a commodity transaction for a fixed price, the settlement processor system being part of a third party system and being communicatively coupled with a merchant financial institution and a customer financial institution to provide settlement and resettlement services, the settlement processor system comprising:

one or more processors;

an interface operable, on the one or more processors, to receive information about a transaction from a merchant point-of-sale device, wherein the information about the transaction includes an identifier for a customer account and a price for the transaction;

an identifier component in communication with the interface, the identifier component operable, on the one or more processors, to determine whether the received identifier is related to a fixed price agreement;

a settlement engine in communication with the identifier component, the settlement engine operable, on the one or processors, to transmit settlement information to the customer financial institution to settle the transaction by transfer of funds to the merchant financial institution; and a broker in communication with the settlement engine and the identifier component, the broker operable, on the one or more processors, to receive the transaction information when the identifier component determines the received identifier is related to a fixed price agreement, the broker operable to generate a resettlement transaction for the difference between the fixed price in the fixed price contract and the price for the transaction and send the resettlement transaction, wherein the settlement engine transmits resettlement information to the merchant financial institution to reimburse the customer by transfer of funds to the customer financial institution.

2. The settlement processor system as defined in claim 1, further comprising a pre-paid contract database operable to store information about one or more fixed price contracts.

3. The settlement processor system as defined in claim 2, wherein the identifier component is operable to read at least a portion of the received identifier to determine if the transaction is associated with a fixed price contract.

4. The settlement processor system as defined in claim 3, wherein the identifier component is operable to compare at least a portion of the received identifier to one or more identifiers for fixed price contracts in the pre-paid contract database to determine if the transaction is associated with a fixed price contract.

5. The settlement processor system as defined in claim 4, wherein, when at least a portion of the received identifier compares to an identifier for the fixed price contract in the pre-paid contract database, the broker is operable to read one or more contract terms from the fixed price contract.

6. The settlement processor system as defined in claim 5, wherein the broker is operable to read the fixed price from the fixed price contract and operable to compare the fixed price to the price for the transaction.

7. The settlement processor system as defined in claim 6, wherein the broker is operable to send the resettlement when the fixed price is lower than the price for the transaction.

8. The settlement processor system as defined in claim 7, wherein the resettlement is for a difference in a cost for the transaction if the fixed price was used instead of the price for the transaction.

9. The settlement processor system as defined in claim 1, wherein the broker creates a resettlement file for each resettlement to be processed during a predetermined amount of time and sends all the resettlements in the resettlement file as a batch process.

10. The settlement processor system as defined in claim 1, wherein the identifier component is operable to compare a merchant of the transaction against a merchant file created for the fixed price contract and operable to send a message to the broker to determine a resettlement when the merchant is in the merchant file.

11. A method for conducting pre-paid futures transactions, the method being executable in a computer system of a third party system communicatively coupled with a merchant financial institution and a customer financial institution, the computer system having a processor and memory, and the method comprising:

the processor receiving transaction information from a merchant, wherein the transaction information includes a transaction price, a merchant identifier, and an customer account identifier;

the processor reading the customer account identifier;

the processor transmitting settlement information to the customer financial institution to settle the transaction by a transfer of funds to the merchant financial institution;

the processor comparing at least a portion of the customer account identifier with one or more identifiers for one or more fixed price contracts to determine if a resettlement transaction should be conducted;

the processor determining the fixed price associated with the fixed price contract;

the processor comparing the fixed price to the transaction price to determine if the fixed price is lower than the transaction price;

the processor determining a difference in cost for the transaction if the fixed price were used for the transaction compared to the transaction price;

the processor creating the resettlement transaction for the difference in cost; and the processor transmitting settlement information associated with the resettlement transaction to the merchant financial institution to reimburse the customer the difference in cost for the transaction by transfer of funds to the customer financial institution.

12. The method as defined in claim 11, further comprising:

the processor reading a merchant file associated with the identified fixed price contract;

the processor determining if the merchant associated with the merchant identifier is in the merchant file; and when the merchant associated with the merchant identifier is in the merchant file, the processor creating the resettlement transaction.

13. The method as defined in claim 11, further comprising:

the processor reading one or more other terms of the fixed price contract;

the processor determining if the one or more other terms are satisfied by the transaction; and when the one or more other terms are satisfied by the transaction, the processor creating the resettlement transaction.

14. The method as defined in claim 11, further comprising:

the processor creating a resettlement batch file with two or more resettlement transactions created during a period of time; and the processor sending all the resettlement transactions in the resettlement batch file as a batch process.

15. The method as defined in claim 14, wherein the processor creates two or more resettlement batch files, wherein each resettlement batch file is related to one financial institution.

16. A non-transitory computer-readable medium readable by a computer system of a third party system communicatively coupled with a merchant financial institution and a customer financial institution, the computer-readable medium having stored thereon instructions causing the computer system to execute a method for conducting pre-paid futures transactions, the method comprising:

instructions for receiving transaction information from a merchant, wherein the transaction information includes a transaction price, a merchant identifier, and a customer account identifier;

instructions for reading the customer account identifier;

instructions for transmitting settlement information to the customer financial institution to settle the transaction by a transfer of funds to the merchant financial institution;

instructions for comparing at least a portion of the customer account identifier with one or more identifiers for one or more fixed price contracts;

when at least a portion of the customer account identifier compares with an identifier of a fixed price contract, instructions for determining if a resettlement transaction should be conducted;

instructions for determining the fixed price associated with the fixed price contract;

instructions for comparing the fixed price to the transaction price to determine if the fixed price is lower than the fixed price;

when the fixed price is lower than the fixed price, determining a difference in cost for the transaction if the fixed price were used for the transaction compared to the transaction price;

instructions for creating the resettlement transaction for the difference in cost; and instructions for transmitting settlement information associated with the resettlement transaction to the merchant financial institution to reimburse the customer the difference in cost for the transaction by transfer of funds to the customer financial institution.

17. The non-transitory computer-readable medium as defined in claim 16, further comprising:

instructions for reading a merchant file associated with the identified fixed price contract;

instructions for determining if the merchant associated with the merchant identifier is in the merchant file; and when the merchant associated with the merchant identifier is in the merchant file, instructions for creating the resettlement transaction.

\* \* \* \* \*